Feb. 1, 1966  J. J. SEYMOUR  3,231,938
INJECTION MOLDING APPARATUS
Filed Jan. 22, 1962  6 Sheets-Sheet 1

INVENTOR.
JAMES J. SEYMOUR
BY

ATTORNEY.

INVENTOR.
JAMES J. SEYMOUR
BY

ATTORNEY.

Feb. 1, 1966  J. J. SEYMOUR  3,231,938
INJECTION MOLDING APPARATUS
Filed Jan. 22, 1962  6 Sheets-Sheet 3

INVENTOR.
JAMES J. SEYMOUR
BY

ATTORNEY.

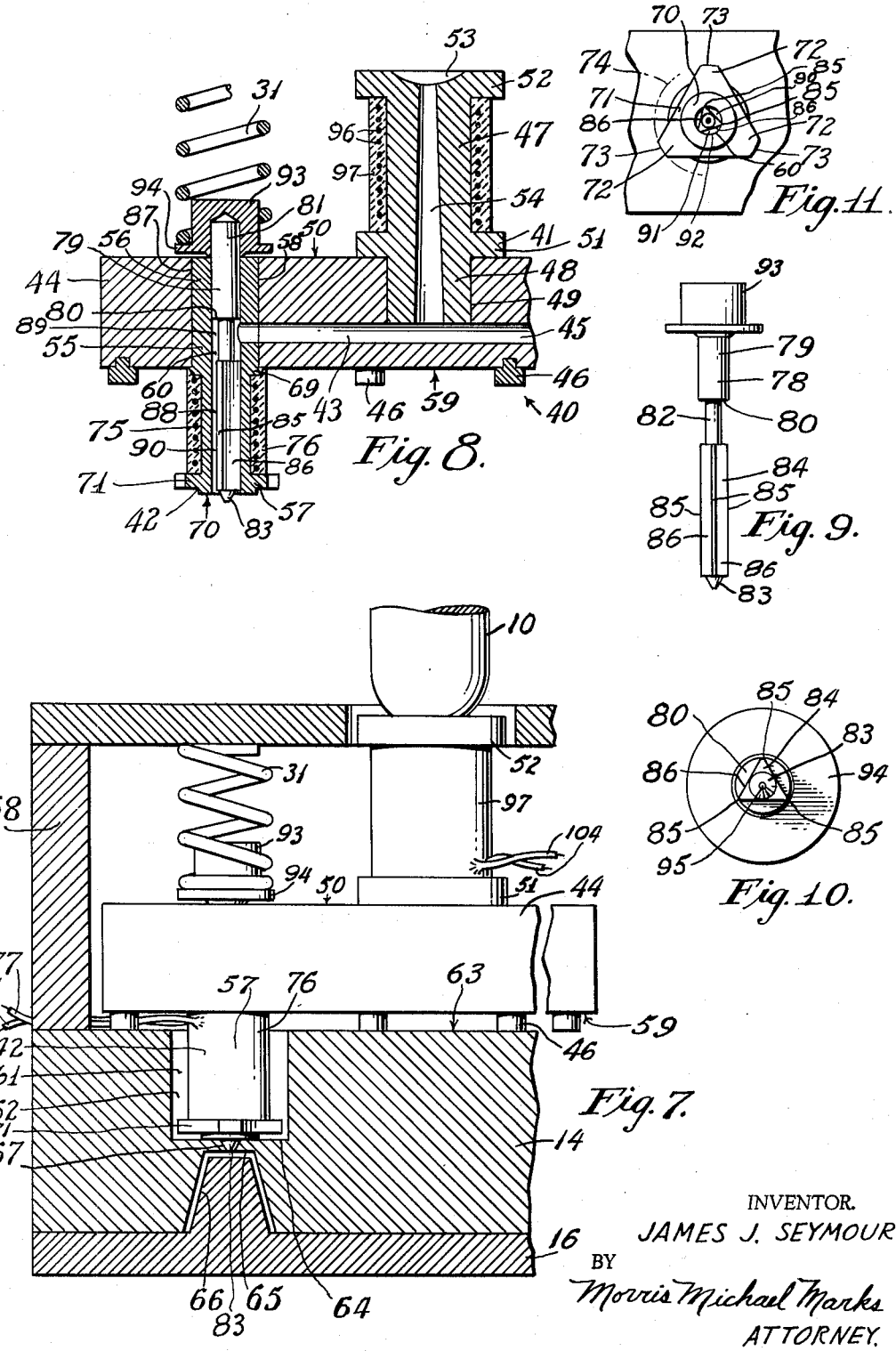

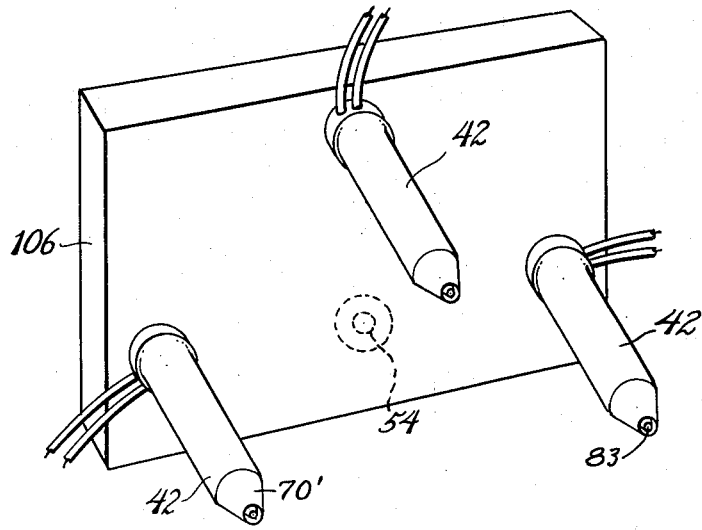
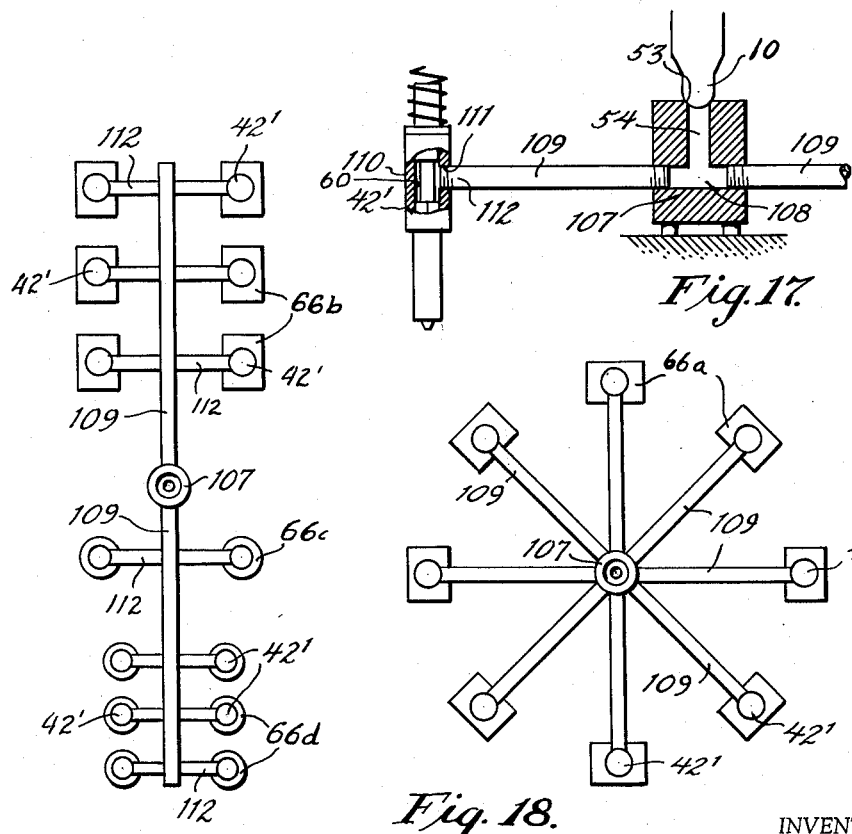

United States Patent Office 3,231,938
Patented Feb. 1, 1966

3,231,938
INJECTION MOLDING APPARATUS
James J. Seymour, Davisville, Pa., assignor, by mesne assignments, to Milton I. Ross, Doylestown, Pa.
Filed Jan. 22, 1962, Ser. No. 168,589
16 Claims. (Cl. 18—30)

This application is a continuation-in-part of application Serial No. 432,746, filed May 27, 1954 and now Patent No. 3,023,458.

In my originally filed application, there was disclosed means and method whereby a product could be molded by injection, without the formation of a sprue in the molded product or a drool at the entrance to the cavity, or a cold slug in the runner leading from the sprue bushing to the cavity. Such means and method included the interposition of a valve chamber between the runner and the entrance to the cavity, and disposing in said chamber a valve plunger which is responsive to the pressure of the plasticized material, operably to open the valve and allow said material to be injected directly into the cavity until said pressure is released, whereupon the valve closes and cuts off the plasticized material at the point of entrance to said cavity. The valve chamber was itself subject to the same pressures which were applied to the mold sections.

In the original application, the valve chamber was shown as inserted within the runner block and heated by receiving heat from the runner block which itself is heated by customary techniques. It has been found however that when this is done, the invention is limited by the limitations imposed by hot runner heating systems in general. Thus for instance, the customarily excessive pressure must be applied to the plastic at the sprue bushing, and excessive heating would still be required to be applied to the plastic through the sprue bushing and along the runner block, in order to keep the material in sufficiently plasticized condition at the entrance to the mold cavity. Thus the runner block itself is necessarily maintained at an excessive temperature; and because of the necessity of keeping the plastic surrounded with heat, a substantial amount of heat is transmitted from the runner block to the cavity mold section. It thus becomes necessary in the case of a number of plastics, to apply a suitable coolant to the cavity mold section. Also, when the molding operation has been interrupted and the runner block allowed to cool, very considerable time is wasted in reheating the runner block sufficiently to melt the plastic in the valve chamber in order to resume operation. Moreover, because of the heating system necessitated by customary hot runner techniques, the array of component elements about the valve chamber can be cumbersome, and seriously limit the number and proximity of cavities capable of being used in a multiple cavity array. Such limitations are very important for instance when it is desired to make a large number of very small items in a multiple cavity system. Furthermore, because of the cumbersome heating system requirements of the standard hot runner block, very substantial limitations are imposed on the angle at which the material can be injected into the cavity.

One object of my present invention therefore is to provide apparatus which will solve the foregoing problems.

Another object of my invention is to provide a sprueless and drool-less injection molding system which can occupy a minimum of space and which will be substantially free of customary limitations of angle of entrance to the mold, and thereby make it possible to utilize a large number of cavities in a multiple cavity array, and to a considerable degree regardless of the size of the cavities or the angle of entrance.

A further object of my invention is to provide a sprueless and drool-less injection molding system in which the molding operation can be interrupted and resumed at will, without serious delays resulting from the necessity of heating the runner block sufficient to melt the plastic in the valve chamber, or otherwise to condition the valve chamber for resumption of operation.

Another object of my invention is to provide a means of injection molding wherein the time required for cycling out is very substantially reduced.

A further object of my invention is to provide a means of injection molding in which heat waste is reduced to a minimum and the possibility of scorching the plastic by excessive heat requirements is substantially eliminated.

Another object of my invention is to provide an injection molding means whereby injection pressures are reduced and substantial savings in power, fuel and coolant are effected.

A further object of my invention is to provide a sprueless and drool-less injection molding apparatus wherein the valve is easily cleaned without the need to tear apart the mold.

Another object of my invention is to provide a hot runner injection molding system wherein the need for heating bands and appurtenant clamps is eliminated.

A further object of my invention is to provide a valve chamber in a sprueless and drool-less injection molding system, which is usable with a standard mold, and which is readily and simply inserted or removed from the mold assembly.

Another object of my invention is to provide a hot runner system without requiring the use of a cumbersome runner block.

A further object of my invention is to provide a hot runner system formed of simple construction readily made of standard parts which can be shipped or stored knockdown, used or replaced at will, and which may comprise a self-contained unit independent of the die-set construction.

Another object of my invention is to provide injection molding means which will substantially increase the production rate.

A further object of my invention is to provide means whereby the valve may be heated and yet be virtually surrounded by air so as to reduce to a minimum, transfer of heat to the cavity section.

Another object of my invention is to assure the presence of plastic in optimum fluid condition in the valve tip at the entrance to the cavity.

A further object of my invention is to provide a sprue runner and valve assembly which is quickly and easily purged, and in which plastics of various kinds and viscosities can readily be substituted one for another.

Another object of my invention is to provide injection molding means whereby heat is effectively applied to the plastic, in a minimum of space.

A further object of my invention is to reduce to a minimum the time required to fill the runners, even in the most complex runner systems, such for instance as those used in multicavity arays.

Another object of my invention is to provide a means whereby shrinkage and other undesired effects on the molded product, is reduced to a minimum.

A further object of my invention is to provide injection molding means whereby the curing or setting time is reduced because less heat is imparted to the cavity section by the molding operation.

Another object of my invention is to provide a means whereby the hot runner may be removed from the mold, and thereby eliminate the conventional practice of subjecting the heat elements in the hot runner area to mold pressures which frequently amount to 100 tons or more, and making it possible to substitute therefor merely the nozzle pressure which is generally approximately 200 lbs.

Additional objects will appear from the more detailed description which follows.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which life reference characters indicate like parts:

FIGURE 7 represents an elevational view, illustrating a sprue runner and valve assembly in operating position with respect to a mold cavity, and embodying my invention.

FIGURE 8 represents a vertical sectional view of the sprue runner and valve assembly illustrated in FIGURE 7.

FIGURE 9 represents an elevational view of the valve stem and cap assembly illustrated in FIGURE 8.

FIGURE 10 represents an enlarged bottom plan view of the valve stem and cap assembly illustrated in FIGURE 9.

FIGURE 11 represents a bottom plan view of the valve assembly illustrated in FIGURES 7 and 8.

FIGURE 16 represents a perspective view illustrating a runner block embodying my invention.

FIGURE 17 represents an elevational view, partly in section, of a sprue runner and valve assembly of modified construction, and embodying my invention.

FIGURE 18 represents a plan view illustrating a multicavity array utilizing the sprue runner and valve assembly illustrated in FIGURE 17, and embodying my invention.

FIGURE 19 represents a plan view illustrating a multicavity array of another type and utilizing the sprue runner and valve assembly illustrated in FIGURE 17 and embodying my invention.

Figure 1:
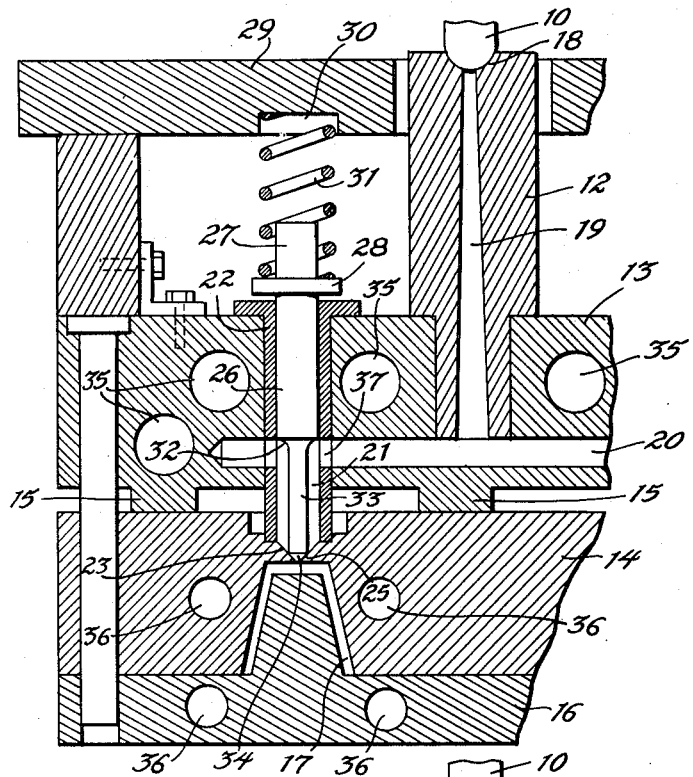
FIGURE 1 represents a vertical sectional view of a portion of a main sprue cavity, die-set and molds and embodying my original invention, illustrating the same in substantially the initial stage of operation prior to the first injection of plasticized material thereinto.
Figure 2:
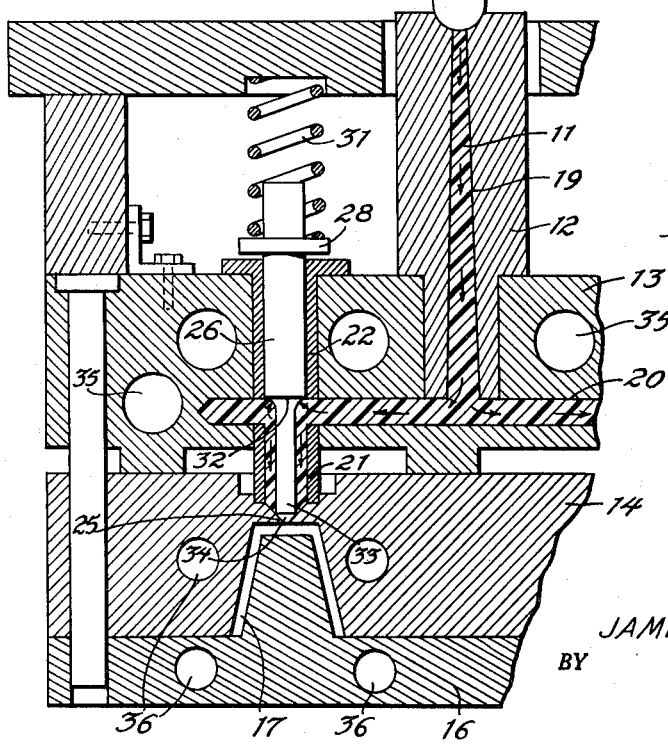
FIGURE 2 represents a vertical sectional view similar to FIGURE 1, but illustrating the same when plasticized material has been injected into the sprue cavity, runner cavity and chamber in accordance with my original invention.
Figure 3:
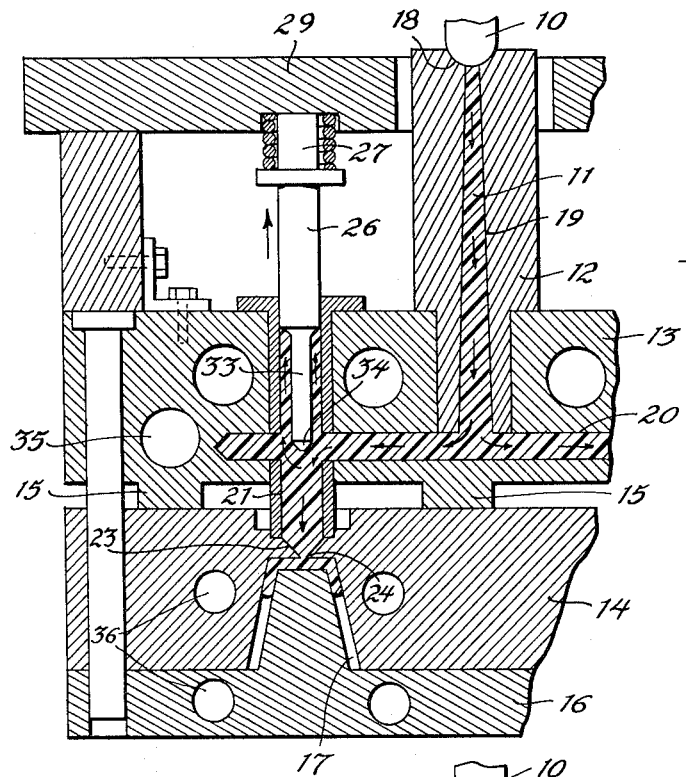
FIGURE 3 represents a view similar to FIGURES 1 and 2, but illustrating the same in a subsequent stage of operation wherein plasticized material is permitted to begin its flow into the mold cavity, in accordance with my original invention.
Figure 4:
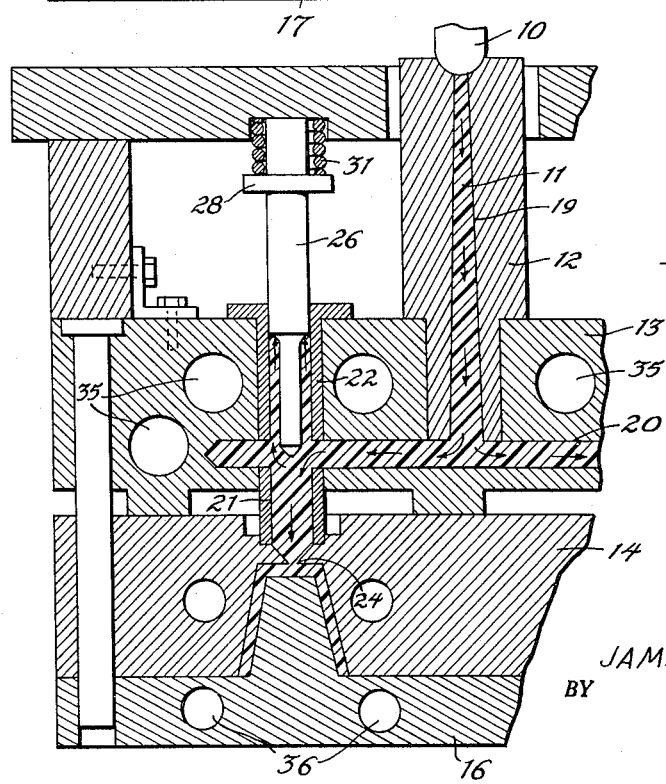
FIGURE 4 represents a view similar to FIGURES 1, 2 and 3, but illustrating a stage of operation subsequent thereto when the mold cavity is completely filled with plastic material, in accordance with my original invention.
Figure 5:
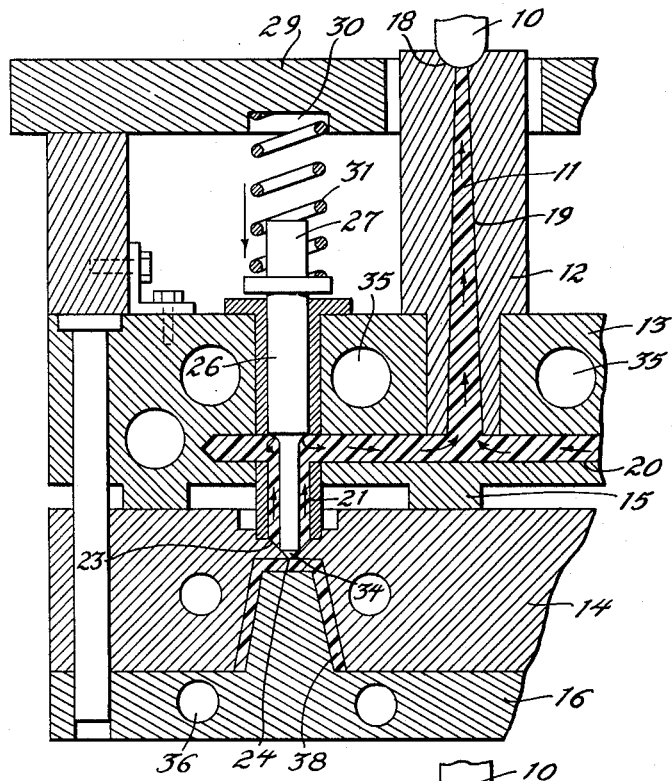
FIGURE 5 represents a vertical sectional view similar to FIGURES 1 to 4 inclusive, but illustrating a stage subsequent thereto and when the gate is closed, in accordance with my original invention.
Figure 6:
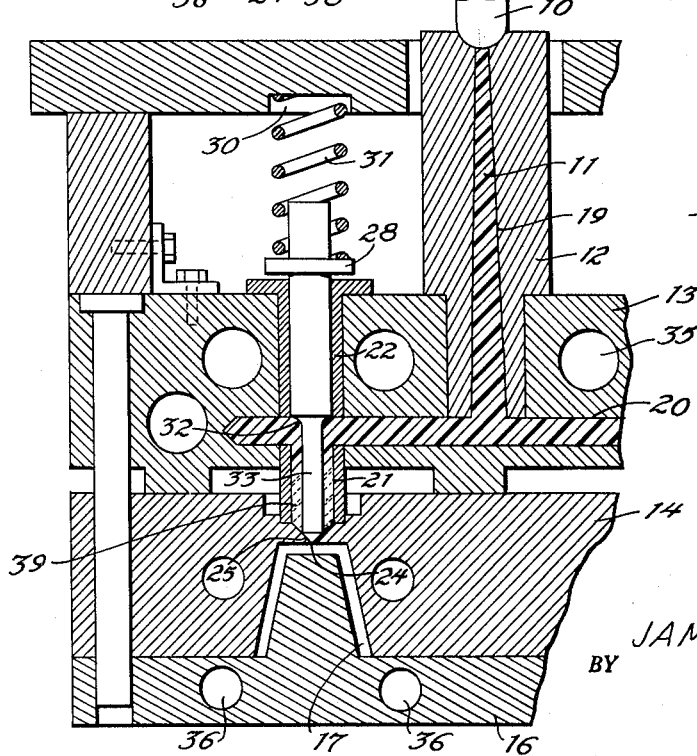
FIGURE 6 represents a vertical sectional view similar to FIGURES 1 to 5 inclusive, but illustrating the beginning of the next cycle of operation, wherein fresh plasticized material is injected into the main sprue, runner and chamber, in accordance with my original invention.
Figure 12:
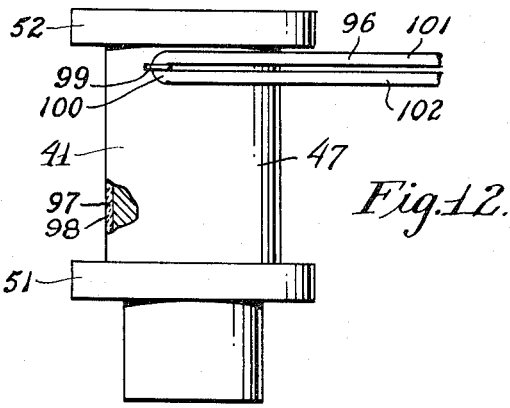
FIGURE 12 represents an elevational view illustrating one stage of a method of winding a heating coil about a plastic-conveying channel, and embodying my invention.
Figure 13:
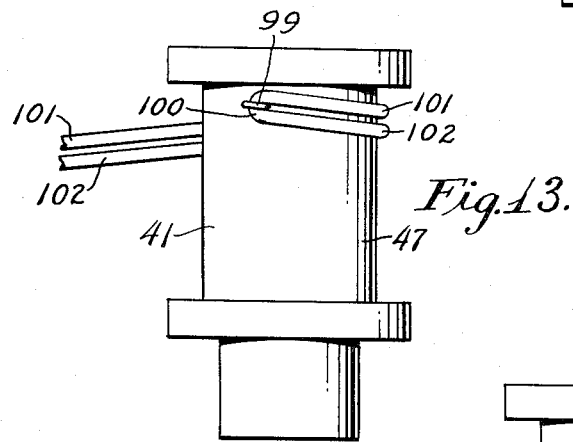
FIGURE 13 represents a subsequent stage in the winding of a heating coil about a plastic-conveying channel, and embodying my invention.
Figure 14:
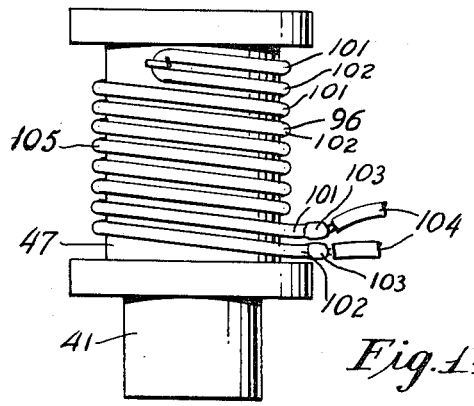
FIGURE 14 represents a further stage in the winding of a heating coil about a plastic-conveying channel, and showing the heating coil connected to a source of electric current, and embodying my invention.

My invention is adapted for use in substantially any standard type of injection molding machine, and is capable of use in any direction; and for purposes of illustration only, it is described herein as a downward injection into horizontal runners which feed downwardly into mold cavities. Thus for instance, with regard to the invention described in my original application, and which is adapted, with modifications, for use in the invention covered in the present continuation-in-part application, a nozzle 10 may be carried by the heating system (not shown) which may be fed by an automatic feeding mechanism (not shown), and adapted to eject plasticized material 11 by the action of an injection ram (not shown) operating under substantial pressures. A sprue bushing 12 may be mounted on a die-set 13 which in turn may be carried by the frame (not shown) of the injection molding machine. A mold 14 may be carried by the die-set 13 and substantially spaced therefrom by suitable spacer portions 15 operably to provide air insulation between the die-set 13 and the mold 14. A movable mold 16 is mounted on the machine in any suitable manner for cooperation with the mold 14 and the establishment of a mold cavity 17 therebetween. There is thus formed a mold structure which may be configurated in any desired form. For purposes of illustration only, the mold 14 may be considered a cavity section, and the mold 16 may be considered a core section. As illustrated the core section 16 comprises a core extension 16′ removably extending into the article-molding cavity 17 of the cavity section 14.

A nozzle seat 18 may be formed on the sprue bushing 12, with a sprue conduit or cavity 19 extending from said seat 18 to a runner conduit or cavity 20 which may be formed through the die-set 13. A chamber 21 is disposed intermediate the runner cavity 20 and the mold cavity 17. The chamber 21 may be disposed in any suitable housing such for instance as the bushing 22 which extends through the die-set 13 and into the mold 14, with a portion 23 of the mold 14 itself serving as a defining element of the chamber 21. This portion 23 preferably comprises a gate 24 substantially surrounded by a valve seat 25 which may be in the form of a hollow cone. The gate 24 preferably opens directly into the mold cavity 17. The runner cavity 20 and chamber 21 may thus be considered a passage means between the sprue cavity 19 and the mold cavity 17.

Suitable pressure-applying or pressure-storage and pressure-responsive means is provided in conjunction with said chamber 21. Thus, a plunger 25 may slideably extend through the chamber housing 22 and preferably projecting externally therefrom as at 27. A spring-seat 28 which may be in the form of a collar surrounding the external projection 27 may be disposed on the plunger 26 and may be formed integrally therewith. A suitable spring-retaining member 29 may be mounted on the die-set 13 or otherwise carried by the machine, and may comprise a spring-retaining recess 30 adapted to anchor one end of a spring such for instance as the compression spring 31 the other end of which may be disposed about the projection 27 in compressive conjunction with the spring seat 28.

The lower end of the plunger 26 comprises a pressure seat portion 32. Projecting beneath the pressure seat portion 32 otherwise operated by said plunger 26 is a valve member or means 33 which may be formed integrally with the plunger 26 and which has at its lower terminus a seal portion 34 adapted when in its lowermost position to bear against the valve seat 25 and close the gate 24; thereby closing said passage means adjacent its region of confluence with said cavity 17, with the outer end of the seal portion 34 terminated in substantially flush registry with the wall formation of said cavity at the mold 14 side thereof.

The runner cavity 20 enters the chamber 21 in an entrance passage 37 disposed substantially intermediate the pressure seat 32 and the valve seat 25 when said plunger 26 is in lowermost position. In the conventional die-set, channels 35 are disposed in the die-set for carrying suitable heating means (not shown) in close proximity to the runner cavity 20 and chamber 21. Channels 36 may be disposed in the molds 14, 16 for carrying suitable cooling means (not shown) for cooling and aiding in the curing of the plastic in the mold cavity 17.

In the operation of the foregoing, the chamber 21 is normally in closed condition with respect to the mold cavity 17, the spring 31 urging the plunger 26 downwardly, with its valve member 33 projecting downwardly therefrom and into gate-closing contact with the valve seat 25. The plastic material is fed into the heating system (not shown) and is ejected therefrom through the nozzle 10 by the injection ram (not shown). The thus plasticized material 11 may thus be passed into the sprue cavity 19, runner cavity 20 and into the chamber 21.

During the flow of the plasticized material 11, the pressure therein is substantially at a minimum, but when the chamber 21 is filled, the pressure is exerted in all directions and accumulates against the pressure seat 32 as the injection ram (not shown) continues its downward thrust. Ultimately, the pressure against the pressure seat 32 has accumulated to such a degree as to overcome the inertia of the spring 31 and thereby to permit the plunger 26 to rise thereagainst. In so doing, the plunger 26, carries with it the valve member 33 and the sealing portion 34 operably to withdraw said sealing portion 34 from the valve seat 25 and to open the gate 24. In so doing, the pressure against the pressure seat 32 is not materially reduced, for the pressure from the injection ram is continuing. Moreover, in a preferred form, the cross-sectional area of the gate 24 is very substantially less than the cross-sectional area of the pressure seat 32. The valve member 33 is accordingly retained in withdrawn position, and the plasticized material 11 is thus permitted to be discharged into the mold cavity 17. This discharge occurs very suddenly, for pressure has been built up to a marked degree in the chamber 21, being the accumulation of the flow pressure, plus the pressure needed to overcome the inertia of the spring 31, plus the pressure exerted by the continuing downward thrust of the injection ram (not shown). Hence, the plasticized material 11 quickly flows directly from the chamber 21 to the mold cavity 17 wherein it is permitted to cool.

In accordance with the cycle of operation of the injection ram (not shown) the ram is withdrawn very shortly after the completion of filling of the mold cavity 17. When this occurs, downward pressure is removed from the main sprue cavity 19, and pressure is thus released from the runner cavity 20 and the chamber 21. This permits the spring 31 to force the plunger 26 downwardly until the sealing portion 34 bears against the valve seat 25, thereby closing the gate 24. In so doing, the sealing portion 34 cuts off any plastic material which may have been disposed between the material 38 in the mold cavity 17 and the plasticized material 11 in the chamber 21; and this occurring directly at the gate of the mold cavity itself, no sprue exists or is permitted to be formed on the molded object.

The plastic material 38 in the mold cavity 17 may now be cured and removed from between the molds 14 and 16 without necessity of opening the molds any extra distance for removal of a sprue portion of the object formed by the plastic 38. Not only so, but the gate 24 being closed, the plasticized material in the heated chamber 21 is sealed off against curing, no drool can occur and no cold slug can be formed therein to clog the gate. Indeed, the passage to the gate 24 is kept clean by the non-plastic valve member being disposed therein when the gate is closed and being mechanically withdrawn therefrom when plasticized material is to flow therethrough. Thus, no clogging can possibly occur.

When the molds 14, 16 are again closed, the cycle of operation may be repeated, substantially as above-described.

In FIGURES 8 to 10 there is illustrated a further development of the foregoing, which makes it possible to produce a number of remarkable results. There is thus provided a sprue runner and valve assembly designated generally as 40. The assembly 40 comprises a sprue bushing 41, and a valve assembly 42 connected to said sprue bushing 41 by means of a runner conduit means 43 which in one preferred form may be of very short length. As illustrated in FIGURE 8, the runner conduit means 43 may comprise a runner block 44 in which is formed a runner conduit 45 extending between the valve assembly 42 and the sprue bushing 41. Suitable spacer members such for instance as the air gap pins 46 may be mounted to project beneath the runner block 44 in a manner to separate the same from the cavity section 14 of the mold.

The sprue bushing 41 may comprise a stanchion 47 having a base portion 48 adapted to be inserted in the runner block 44 in a suitable orifice 49 formed in the runner block 44 and extending from the runner conduit 45 to an exterior face 50 of the runner block 44. A flange 51 may be disposed on the stanchion 47 in a manner to bear against the exterior face 50 of the runner block 44. If desired, another flange 52 may be disposed about the top of the stanchion 47. A nozzle seat 53 is disposed at the top of the stanchion 47, and a sprue conduit or cavity 54 extends from said nozzle seat 53 to the bottom of the stanchion 47, where it intercepts the runner conduit 45 in the runner block 44.

The valve assembly 42 may comprise a valve bushing 55 having a base portion 56 and finger portion 57. The base portion 56 may be adapted to be inserted within a suitable orifice 58 extending through the runner block 44 and between the exterior face 50 and the opposed face 59 thereof. A passage 60 extends longitudinally through the base portion 56 and the finger portion 57.

The finger portion 57 is adapted to project beneath the lower face 59 of the runner block 44, and to be centered with respect to the entrance orifice of the mold cavity. Thus, the finger portion 57 may be inserted within a suitable recess 61 in the cavity mold section 14. The recess 61 may comprise a cylindrical, or a conical (not shown), side wall 62 extending from the upper face 63 of the mold section 14 to a bottom wall 64 formed in said cavity mold section 14 preferably a short distance from a wall 65 of the cavity 66. When the wall 62 is in conical form (not shown) the base of the cone would be along the upper face 63 of the mold section 14, and the apex would be substantially beneath the bottom wall 64 of the recess 61. A preferably conical entrance orifice 67 extends between the bottom wall 64 of the recess 61 and the wall 65 of the cavity 66, and is disposed about the same longitudinal axis as the axis of the passage 60 of the valve assembly 42.

The finger portion 57 may comprise a flange means 69 adapted to bear against the lower face 59 of the runner block 44, and a seat portion 70 preferably disposed at the lower extremity of the finger portion 57, and completely surrounding the passage 60 at said extremity. If desired, a flange 71 may be formed about said finger portion 57 above said seat portion 70, and may comprise spacer vanes 72 projecting radially to guide-edges 73 formed along a circular arc 74 substantially corresponding to an arc of the cylindrical or conical wall 62 preferably at the portion thereof adjacent the bottom wall 64 of the recess 61, thereby to assure accurate centering of the finger portion 57 about said entrance orifice 67.

Suitable electrical heating means such for instance as the resistance wire 75 may be disposed about the finger portion 57 and be insulated therefrom by suitable means such for instance as the ceramic 76, the heating means 75 preferably extending substantially from the vicinity of the flange means 69 to that of the flange 71. Suitable electrical conductors 77 extend from the heating means 75 at the portion thereof adjacent the flange means 69, and along the lower face 59 of the runner block 44 to a suitable source (not shown) of electric current.

Longitudinally disposed within the passage 60 is a valve stem 78 comprising a plunger portion 79 extending between a pressure seat 80, disposed above the runner conduit 45, and an external projection 81 extending above the upper face 50 of the runner block 44. The valve stem 78 also comprises a portion of less cross-section than the pressure seat 80. Thus, it may comprise a reduced diameter portion 82 projecting beneath the pressure seat 80, and the stem terminates in a seal portion 83 adapted to project beneath the seat portion 70 when the valve stem 78 is in its lowermost position. Intermediate the seal portion 83 and the reduced diameter portion 82, the valve stem 78 may comprise a suitable spacer portion 84. In a preferred form, this spacer portion 84 comprises guide-edges 85 disposed a distance from the longitudinal axis of the valve stem 78 substantially equal to the radius of the passage 60, thereby assuring accurate disposition of the seal portion 83 with respect to the longitudinal axis of the passage 60. Substantially flat walls 86 may be disposed between adjacent guide-edges 85; and said walls 86 and guide-edges 85 preferably extend from immediately above the seal portion 83, substantially throughout the length of said finger portion 57 when said valve stem 78 is disposed in lowermost position. There is thus formed within said passage 60 a bearing portion 87 for the plunger portion 79, and a valve chamber 88 comprising an upper, plastic-material receiving position 89 and a lower, plastic-material passage portion 90 comprising the hollow segments 91 defined by the inner or stem walls 86 and the cylindrical arcs 92 of the wall of the passage 60 subtended by said walls 86.

In a preferred form, a cap 93 is disposed on the external projection 81 of the valve stem 78, and comprises a flange 94 adapted to receive and bear against a suitable compression spring 31 which may be mounted on the die-set 68 in a manner to urge the cap 93 and the valve stem 78 carried thereby in a downward direction toward the conical orifice 67.

The seal portion 83 is preferably formed about the same conical section as that of the conical orifice 67, and may be truncated at its lower end to form a flat surface 95 which is flush with the cavity wall 65 into which the orifice 67 opens.

In one form of my invention, a selected portion of the sprue runner and valve assembly, such for instance as the sprue bushing 41, may also be heated in a manner similar to the finger 57. Thus, the bushing 41 may have disposed about the stanchion portion 47 thereof, suitable electrical heating means such for instance as the resistance wire 96 suitably insulated from the metal portion of the sprue bushing 41 by any suitable means such for instance as the ceramic 97.

Figure 15:
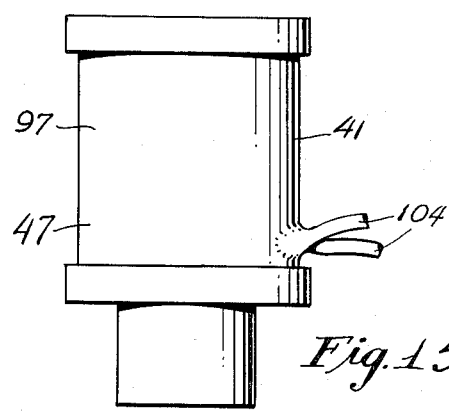
FIGURE 15 represents an elevational view illustrating a subsequent stage in the formation of a heating coil about a plastic-conveying channel, and embodying my invention.

In FIGURES 12–15 inclusive there is illustrated a method of forming an electrical heating means about a portion of the sprue runner and valve assembly in accordance with my invention; and it is to be understood that although for purposes of clarity of illustration the portion is illustrated as being the sprue bushing 41, the same principles would apply to the finger portion 57 as illustrated in FIGURES 7 and 8, or to any other selected portion of the sprue runner and valve assembly. Thus, that portion of the sprue bushing 41 which is to be in the immediate vicinity of the electrical resistance means 96, may first be coated with a layer 98 of the ceramic 97. In one preferred procedure, this is accomplished by painting the stanchion 47 and adjacent areas of the flanges 51 and 52 with a suitable porcelain cement or similar composition, which may then be baked until the ceramic or other composition has dried and cured. A suitable anchor member such for instance as the hook 99 may be affixed to the stanchion portion 47 in a manner to project outwardly therefrom. The outwardly projecting portion of the anchor member 99 is preferably in electrically non-conducting relation to the metal portion of the bushing 41. A suitable electrical heating wire such for instance as the resistance wire 96 commercially known under the trademark "Nichrome," may be doubled in a manner to form a bight 100 which is then interlocked with the anchor member 99 which serves not only to secure the bight 100 to the stanchion, but also to separate the resulting strands 101 and 102 of the double resistance wire. The double wire 96 may then be helically wound about the stanchion 47 with the strands 101 and 102 spaced from each other, and with adjacent flights also spaced from each other, until the helix 105 has been completed. The free ends of the strands 101, 102 may then be secured by any suitable means such for instance as by solder 103 to suitable electrical conduits 104 leading to a source (not shown) of electrical energy. Additional ceramic such for instance as porcelain cement or similar composition may then be applied in a manner to fill the interstices between the strands and flights of the helix 105, and between the ends of the helix 105 and adjacent flanges 51 and 52, and also to coat the exterior of the helix, until the entire helix is embedded in the ceramic 97, as illustrated in FIGURE 15. The whole unit may then be similarly baked.

In FIGURE 16 is illustrated a runner block 106 having a plurality of valve assemblies 42 fed by runners (not shown) extending from a sprue cavity 54, in accordance with my invention. The finger seat portions of the valve assemblies 42 illustrated in this figure, are of modified construction embodying my invention, and are formed in the shape of a cone section 70′ adapted either to conform to a mold entrance recess similar to the recess 61 but formed as a cone section, or to bear against an annulus (not shown) in a mold entrance recess.

In FIGURE 17 is illustrated a modified construction embodying my invention, wherein the sprue bushing is replaced by a sprue head 107 comprising a nozzle seat 53, a sprue cavity 54, and a runner manifold conduit 108. Suitable high pressure and high temperature tubing 109 such for instance as that made of tempered steel or other suitable material is each secured at one end to the sprue head 107 by any suitable means such for instance as threading, in a manner such that each tube 109 registers with a runner manifold conduit 108. The opposed end of each tube 109 is secured to a valve assembly 42′ wherein the valve bushing 55 is replaced by a base portion 110 having an orifice 111 adapted to receive the outer end 112 of the tubing 109 in a manner to hold said tubing 109 secure while affording open communication between the interior of the tubing 109 and the passage 60. The valve 42′ otherwise operates in a manner similar to the valve assembly 42.

In FIGURES 18 and 19 are illustrated multiple valve arrays adapted for use with multiple cavity molds, such for instance as those having a variety of molds 66a, 66b, 66c, 66d, in accordance with my invention. In the array illustrated in FIGURE 18, a sprue head 107 is connected with a multiplicity of valve assemblies 42′ by means of tubing 109. In the array illustrated in FIG- URE 19, a sprue head 107 is connected with valve assemblies 42' by means of tubing 109 secured directly to the sprue head 107, and sub-tubing 112 extending from the tubing 109 to the valve assemblies 42'.

In accordance with my invention, the resistance wire 75 about the finger portion 57 is heated to a controlled temperature by any suitable means such as a rheostat, thermostatically controlled device, or the like (not shown). The finger is thus heated to an optimum temperature for best performance of the plastic material at the location of its entrance into the cavity 66. This material is itself preheated to a flowing liquid condition when it is introduced into the sprue cavity 54. When it thereafter flows through the runner conduit 45 and into the valve assembly 42, instead of becoming cooled as the distance from the nozzle seat 53 increases, it becomes reheated by the heat imparted to the valve assembly 42 by the resistance wire 75. Moreover, the heat imparted to the finger portion 57 and the plastic material contained therein by the resistance wire 75, travels by conduction through said plastic material and the valve assembly 42, runner conduit 45 and sprue cavity 54 surrounding the same, back toward the nozzle seat 53.

Thus the plastic material in the sprue runner and valve assembly 40 is maintained in a constantly fluid condition without degradation of the plastic, as long as the nozzle 10 bears against the nozzle seat 53 and the machine heater (not shown) is in operation. At such times as the machine heater is not in operation, or the nozzle is not bearing against the seat 53, enough heat may be imparted by the wire 75 to the plastic material in the assembly 40, to keep said material fluid; or in the instances where a heating element such as the wire 96 is used about the sprue bushing 41, the heating element 96 will effectively maintain the heat of the plastic material within said bushing, and will cooperate with the heating element 75 to maintain the heat of the plastic in the assembly 40, and in this manner less current and lower temperatures will be required at each element. Also, at such times as the operation of the machine has been interrupted and it is desired to resume operation, by energizing the heating elements about both the sprue bushing and the finger it is possible to reduce to less than a minute the time necessary to plasticize the material within the sprue runner and valve assembly, so that the machine may resume operation with a delay far less than that experienced with conventional runner assemblies.

Because of the optimum flow condition of the plastic in the sprue runner and valve assembly 40, it is no longer necessary to impose excessive pressures on the plastic in order to force a cooling plastic through the runners and into the cavity. The resultant reduction in nozzle temperature and pressure not only effects a saving in cost of operation, but also improves the condition of the plastic material. Moreover, because by means of my invention it is no longer necessary to utilize heating channels 35 adjacent the runner conduit, the runner conduit can be kept relatively short and thereby loss of heat due to distance from the nozzle seat 53 can be minimized. Even where a long runner conduit is used however, as for instance when it is used as a manifold from which sub-tubing 112 lead to individual valve assemblies 42', deleterious cooling does not take place, for each valve assembly 42' heats the plastic material reaching it, as well as the subtubing to which the assembly is attached, and by conduction this heat is transferred back to the runner tubing 109. As a result, even in a multiple array, the plastic is kept at optimum temperature and flowing condition, regardless of its location in the sprue runner and valve assembly; and since the plastic is kept in fluid condition, and pressure in a confined fluid is equal in the entire system, there is no loss of pressure in even the remotest valve assembly 42'.

Moreover, by means of this invention, it is possible to eliminate the runner block together with its many limitations such as weight, material, labor in machining and handling, and the like; and to substitute instead, an easily assembled sprue head, tube and valve assembly which can be made of standard materials which are readily shipped or kept in stock in knock-down condition, and assembled or disassembled at will, according to the needs of the molds. Thus the formation of the runner assembly can be effected by standard parts and by relatively unskilled labor, while the resultant operation is far superior to that of the conventional runner assembly.

Also, because of the elimination of the need for separate heaters for the runner conduit, and the resultant reduction in mass of runner assembly, as well as the reduction of conductive contact between the sprue runner and valve assembly and the cavity mold, a marked decrease in required coolant for the mold is effected. Thus, it has been found in practice that the ratio of coolant required for a standard type mold, to that required by the mold using my invention, is approximately 10 to 1.

Furthermore, by the use of my invention, the amount of electricity required for heating the hot runner system has been reduced from approximately 2,000 watts in a conventional system to approximately 100 to 200 watts in my invention.

Because of the substantial reduction in heat differential, both the plastic and the machine have been found easier to control.

In addition, after the initial heating of the plastic, it has been found in practice that whereas a conventional machine requires from 6 to 8 hours to start the automatic sequential operation, by the use of my invention this requires approximately only 30 seconds.

Moreover, because of the disposition of the valve outlet in a heated finger, and the freeing of the sprue runner and valve assembly from the 100 ton mold pressure, it is possible to dispose the finger at various angles with respect to the mold in order to effect an entrance at the most desired locations.

It is to be understood that my invention is not limited to the use of a sprue cavity such as those illustrated, or indeed to a sprue bushing or a sprue nozzle, and will work quite satisfactorily in injection molding systems wherein the plasticized material is injected directly into a runner conduit; and that when the phrase "sprue cavity" is used herein, it includes every source of introduction of plasticized material into the runner.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. In an injection molding system, the combination of a sprue conduit, a valve assembly, and a runner conduit extending from said sprue conduit to said valve assembly; said valve assembly being adapted to discharge plasticized material directly into the cavity of a mold through the entrance orifice thereof, and comprising a finger portion, a passage extending longitudinally therethrough, and a valve stem disposed in said passage, said valve stem comprising a plunger portion terminating interiorly in a pressure seat, a portion of reduced cross-section disposed below said pressure seat, a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; said runner conduit communicating with the interior of said passage at a passage entrance disposed between said pressure seat and said seal portion; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edges and passage wall together with said subtended arc defining a passage for the flow of said plasticized material from said passage entrance to the vicinity of said seal portion; and said finger having spacer means to center said finger about said entrance orifice while maintaining a substantial portion of the exterior of said finger in an air-insulated condition.

2. In an injection molding system, the combination of a sprue conduit, a valve assembly, and a runner conduit extending from said sprue conduit to said valve assembly; said valve assembly being adapted to discharge plasticized material directly into the cavity of a mold through the entrance orifice thereof, and comprising a finger portion, a passage extending longitudinally therethrough, and a valve stem disposed in said passage, said valve stem comprising a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; said runner conduit communicating with the interior of said passage; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edge and passage wall together with said subtended arc defining a passage for the flow of said plasticized material from said passage entrance to the vicinity of said seal portion; and said finger having spacer means to center said finger about said entrance orifice while maintaining a substantial portion of the exterior of said finger in an air-insulated condition.

3. In an injection molding system, the combination of a sprue conduit, a valve assembly, and a runner conduit extending from said sprue conduit to said valve assembly; said valve assembly being adapted to discharge plasticized material directly into the cavity of a mold through the entrance orifice thereof, and comprising a finger portion, a passage extending longitudinally therethrough, and a valve stem disposed in said passage, said valve stem comprising a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; said runner conduit communicating with the interior of said passage; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edges and passage wall together with said subtended arc defining a passage for the flow of said plasticized material from said passage entrance to the vicinity of said seal portion.

4. In an injection molding system, the combination of a sprue conduit, a valve assembly, and a runner conduit extending from said sprue conduit to said valve assembly; said valve assembly being adapted to discharge plasticized material directly into the cavity of a mold through the entrance orifice thereof, and comprising a finger portion, a passage extending longitudinally therethrough, and a valve stem disposed in said passage, said valve stem comprising a seal portion; said finger portion being disposed in combination with an electrical heating means permanently mounted thereon and integrated therewith by substantially ceramic insulation, said insulation coating both said heating means and the region of said finger portion in the vicinity thereof; and means adapted in one stage of operation, to urge said seal portion toward the entrance orifice of said mold cavity; said runner conduit communicating with the interior of said passage; said finger comprising a seat adapted to bear against said cavity mold about said entrance orifice in a manner to inhibit escape of plasticized material therebetween.

5. In an injection molding system, the combination of a sprue conduit, a valve assembly, and a runner conduit extending from said sprue conduit to said valve assembly; said sprue conduit having mounted thereon, electrical heating means insulated therefrom by ceramic insulation; said valve assembly being adapted to discharge plasticized material directly into the cavity of a mold through the entrance orifice thereof, and comprising a finger portion, a passage extending longitudinally therethrough, and a valve stem disposed in said passage, said valve stem comprising a seal portion; said finger portion being disposed in combination with an electrical heating means permanently mounted thereon and integrated therewith by substantially ceramic insulation, said insulation coating both said heating means and the region of said finger portion in the vicinity thereof and means adapted in one stage of operation, to urge said seal portion toward the entrance orifice of said mold cavity; said runner conduit communicating with the interior of said passage; said finger comprising a seat adapted to bear against said cavity mold about said entrance orifice in a manner to inhibit escape of plasticized material therebetween.

6. In an injection molding system, a valve assembly adapted to discharge plasticized material directly into the cavity of a mold through the entrance orifice thereof, and comprising a finger portion, a passage extending longitudinally therethrough, and a valve stem disposed in said passage, said valve stem comprising a plunger portion terminating interiorly in a pressure seat, a portion of reduced cross-section disposed below said pressure seat, a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; a passage entrance disposed between said pressure seat and said seal portion; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edges and passage wall together with said subtended arc defining a passage for the flow of said plasticized material intermediate said passage entrance and the vicinity of said seal portion; and said finger having spacer means to center said finger about said entrance orifice while maintaining a substantial portion of the exterior of said finger in an air-insulated condition.

7. In an injection molding system, a valve assembly adapted to discharge plasticized material directly into the cavity of a mold through the entrance orifice thereof, and comprising a finger portion, a passage extending longitudinally therethrough, and a valve stem disposed in said passage, said valve stem comprising a plunger portion terminating interiorly in a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; a passage entrance disposed between said pressure seat and said seal portion; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edges and wall together with said subtended arc defining a passage for the flow of said plasticized material from said passage entrance to the vicinity of said seal portion.

8. Injection-molding apparatus comprising; a mold structure including relatively movable core and cavity sections defining therebetween an article-molding cavity; passage means for advancing an article-molding material under pressure flow into said cavity; movable valve means disposed in said passage means immediately adjacent its region of confluence with said cavity, said valve means when in its position of closure having its outer end terminated in substantially flush registry with a wall formation of said cavity; at least a portion of said passage disposed about said valve means, being disposed in a finger having formed thereabout an electrical heating means permanently integrated therewith by means of substantially ceramic insulation coating both said heating means and the region of said finger in the vicinity thereof; means responsive to the pressures of molding material advancing through said passage means for maintaining said valve means in an open position in admitting of the flow of said molding material into said cavity; and pressure-applying means removed from contact with said molding material and acting constantly on said valve means to move the latter toward and maintain the same in its position of passageway closure when the pressures exerted on said valve means by the molding material advancing through the passage means fall below those applied to said valve means by said constantly acting pressure means.

9. In an injection molding system, a plural valve array, comprising a sprue conduit, and a plurality of valve assemblies connected to said sprue conduit by means of at least one runner conduit; each of said valve assemblies being adapted to discharge plasticized material directly into the cavity of a mold through the entrance orifice thereof, and comprising a finger portion, a passage extending longitudinally therethrough, and a valve stem disposed in said passage, said valve stem comprising a plunger portion terminating interiorly in a pressure seat, a portion of reduced cross-section disposed below said pressure seat, a seal portion, and a spacer portion; said finger portion being disposed in combination with an electrical heating means permanently mounted thereon and integrated therewith by substantially ceramic insulation coating both said heating means and the region of said finger portion in the vicinity thereof; and means adapted in one stage of operation, to urge said seal portion toward the entrance orifice of said mold cavity; a passage entrance disposed between said pressure seat and said seal portion; said finger comprising a seat adapted to bear against said cavity mold about said entrance orifice in a manner to inhibit escape of plasticized material therebetween; and said spacer portion comprising guide edges disposed along the wall of said passage, an inner wall joining adjacent guide edges and subtending an arc of said passage, said edges and passage wall together with said subtended arc defining a passage for the flow of said plasticized material from said passage entrance to the vicinity of said seal portion; and said finger having spacer means to center said finger about said entrance orifice while maintaining a substantial portion of the exterior of said finger in an air-insulated condition.

10. A valve adapted to be used in an injection molding system, said valve comprising:
a hollow finger portion;
an entrance port adapted to receive plasticized material;
a discharge outlet adapted to discharge plasticized material into an orifice opening into a cavity of a mold;
said finger portion being disposed in combination with an electrical heating means permanently mounted thereon and integrated therewith by substantially ceramic insulation, said insulation coating both said heating means and the region of said finger portion in the vicinity thereof.

11. A valve as defined in claim 10, and further characterized by:
a passage extending longitudinally through said finger portion between said entrance port and said discharge outlet; and
a movable valve stem disposed in said passage.

12. A valve as defined in claim 10, and further characterized by:
a passage extending longitudinally through said finger portion between said entrance port and said discharge outlet;
a movable valve stem disposed in said passage;
said valve stem comprising:
a plunger portion terminating interiorally in a pressure seat and
a seal portion.

13. A valve as defined in claim 10, and further characterized by:
a passage extending longitudinally through said finger portion between said entrance port and said discharge outlet; and
a movable valve stem disposed in said passage;
said valve stem comprising:
a plunger portion terminating interiorally in a pressure seat,
a portion of reduced cross-section disposed below said presure seat,
a seal portion, and
a spacer portion.

14. A valve as defined in claim 10, and further characterized by:
a passage extending longitudinally through said finger portion between said entrance port and said discharge outlet;
a movable valve stem disposed in said passage;
said valve stem comprising:
a plunger portion terminating interiorally in a pressure seat,
a portion of reduced cross-section disposed below said pressure seat,
a seal portion, and
a spacer portion;
said finger comprising a seat adapted to bear against said mold about said orifice opening into the cavity thereof, in a manner to inhibit escape of plasticized material therebetween.

15. A valve as defined in claim 10, and further characterized by:
a passage extending longitudinally through said finger portion between said entrance port and said discharge outlet;
a movable valve stem disposed in said passage;
said valve stem comprising:
a plunger portion terminating interiorally in a pressure seat,
a portion of reduced cross-section disposed below said pressure seat,
a seal portion, and
a spacer portion;

means adapted in at least one stage of operation to urge said seal portion toward said orifice opening into the cavity of a mold;

said entrance port communicating with the interior of said passage at a location disposed between said pressure seat and said seal portion.

16. A valve as defined in claim 10, and further characterized by:

a passage extending longitudinally through said finger portion between said entrance port and said discharge outlet;

a movable valve stem disposed in said passage;

said valve stem comprising:

a plunger portion terminating interiorally in a pressure seat, a portion of reduced cross-section disposed below said pressure seat, a seal portion, and a spacer portion;

said finger comprising a seat adapted to bear against said mold about said orifice opening into the cavity thereof, in a manner to inhibit escape of plasticized material therebetween;

means adapted in at least one stage of operation to urge said seal portion toward said orifice opening into the cavity of a mold;

said entrance port communicating with the interior of said passage at a location disposed between said pressure seat and said seal portion.

References Cited by the Examiner

UNITED STATES PATENTS

| | | | |
|---|---|---|---|
| 1,481,113 | 1/1924 | Wells | 338—275 |
| 2,478,013 | 8/1949 | Roddy | 18—55 |
| 2,668,325 | 2/1954 | Goodwin | 18—30 |
| 2,865,050 | 12/1958 | Strauss | 18—30 |
| 2,871,517 | 2/1959 | Allard | 18—30 |
| 2,899,710 | 8/1959 | Hendry | 18—55 |
| 3,010,156 | 11/1961 | Smith | 18—30 |
| 3,014,241 | 12/1961 | Hehl | 18—30 |
| 3,023,458 | 3/1962 | Seymour | 18—30 |
| 3,024,498 | 3/1962 | Bronnenkant et al. | 18—30 |
| 3,055,055 | 9/1962 | Cook et al. | 18—30 |
| 3,055,084 | 9/1962 | Canegallo | 219—155 |
| 3,064,335 | 11/1962 | Fletcher | 219—155 |

J. SPENCER OVERHOLSER, *Primary Examiner.*

MICHAEL V. BRINDISI, WILLIAM J. STEPHENSON, *Examiners.*